United States Patent
Zhang et al.

(10) Patent No.: US 9,661,551 B2
(45) Date of Patent: May 23, 2017

(54) DATA TRANSMISSION IN MOBILE AD-HOC NETWORK

(75) Inventors: Xinggong Zhang, Beijing (CN); Zongming Guo, Beijing (CN)

(73) Assignee: PEKING UNIVERSITY (CN)

(*) Notice: Subject to any disclaimer, the term of this patent is extended or adjusted under 35 U.S.C. 154(b) by 453 days.

(21) Appl. No.: 13/147,594

(22) PCT Filed: Jul. 8, 2010

(86) PCT No.: PCT/CN2010/075057
§ 371 (c)(1),
(2), (4) Date: Aug. 3, 2011

(87) PCT Pub. No.: WO2012/003637
PCT Pub. Date: Jan. 12, 2012

(65) Prior Publication Data
US 2012/0044864 A1 Feb. 23, 2012

(51) Int. Cl.
*H04W 28/02* (2009.01)
*H04W 40/24* (2009.01)

(52) U.S. Cl.
CPC ................ *H04W 40/246* (2013.01)

(58) Field of Classification Search
USPC ........................................................ 370/328
See application file for complete search history.

(56) References Cited

U.S. PATENT DOCUMENTS

| | | | |
|---|---|---|---|
| 7,649,884 B1* | 1/2010 | Ahmed et al. | 370/390 |
| 8,406,127 B2* | 3/2013 | Fall et al. | 370/223 |
| 2002/0145978 A1* | 10/2002 | Batsell et al. | 370/238 |
| 2004/0025018 A1* | 2/2004 | Haas et al. | 713/168 |

(Continued)

FOREIGN PATENT DOCUMENTS

| | | |
|---|---|---|
| CN | 101127663 A | 2/2008 |
| CN | 101335701 A | 12/2008 |

(Continued)

OTHER PUBLICATIONS

Notification of Transmittal of the International Search Report and the Written Opinion of the International Searching Authority, Apr. 21, 2011.

*Primary Examiner* — Gregory Sefcheck
*Assistant Examiner* — Jenkey Van
(74) *Attorney, Agent, or Firm* — Ren-Sheng International

(57) ABSTRACT

Techniques are generally described related to a mobile ad-hoc network. One example method for transmitting data from a source node to a destination node in a mobile ad-hoc network may include receiving a route reply packet from a first node by a second node; identifying the route reply packet as an overheard route reply packet by the second node; adding a first routing entry in a routing table of the second node and the first routing entry being associated with the overheard route reply packet by the second node; broadcasting a routing entry added message associated with the first routing entry by the second node; receiving data transmitted from a third node and the data being transmitted by the third node responsive to the routing entry added message by the second node; and sending data received from the third node towards the destination node via an active route established based on the first routing entry in the routing table of the second node by the second node.

6 Claims, 6 Drawing Sheets

100

130

(56) References Cited

U.S. PATENT DOCUMENTS

| | | | |
|---|---|---|---|
| 2005/0185587 A1* | 8/2005 | Klinker | H04L 12/4633 370/237 |
| 2006/0067232 A1* | 3/2006 | Lee et al. | 370/235 |
| 2006/0215556 A1* | 9/2006 | Wu et al. | 370/230 |
| 2007/0280174 A1* | 12/2007 | Pun | 370/338 |
| 2008/0002640 A1* | 1/2008 | Westphal | 370/338 |
| 2008/0062916 A1* | 3/2008 | Mosko et al. | 370/328 |
| 2008/0310340 A1* | 12/2008 | Isozu | H04L 45/10 370/328 |
| 2009/0046622 A1* | 2/2009 | Hua | 370/315 |
| 2009/0046714 A1* | 2/2009 | Holmer et al. | 370/389 |
| 2009/0161578 A1* | 6/2009 | Yeung et al. | 370/254 |
| 2009/0323519 A1* | 12/2009 | Pun | 370/225 |
| 2010/0214932 A1* | 8/2010 | Qian et al. | 370/244 |

FOREIGN PATENT DOCUMENTS

| | | |
|---|---|---|
| CN | 101420379 A | 4/2009 |
| JP | 2006020175 A | 1/2006 |
| WO | 2008001271 A2 | 1/2008 |

\* cited by examiner

300 A computer program product

304 A signal bearing medium 302 at least one of one or more instructions to overhear a route reply packet, wherein the route reply packet is from a first node;

one or more instructions to add a first routing entry in a routing table of a second node which overheard the route reply packet;

one or more instructions to broadcast a message associated with the first routing entry; or one or more instructions to receive data from a third node which receives the broadcasted message 306 a communication medium 308 a non-transitory computer readable medium 310 a recordable medium

FIG. 3

DATA TRANSMISSION IN MOBILE AD-HOC NETWORK

CROSS REFERENCE TO RELATED APPLICATION

The present application is a U.S. National Stage filing under 35 U.S.C. §371 of the International Application PCT/CN2010/075057, filed on Jul. 8, 2010 and entitled "DATA TRANSMISSION IN MOBILE AD-HOC NETWORK." The disclosure of the forgoing application is hereby incorporated by reference in its entirety, including any appendices or attachments thereof, for all purposes.

BACKGROUND

A mobile ad-hoc network (MANET) is a self-configuring network of mobile devices connected by wireless links. A mobile device in a MANET is free to move independently in any direction, and will therefore change its links to other mobile devices frequently. In addition, a mobile device may be configured to act as a router by forwarding traffic unrelated to its own use to other mobile devices. The present disclosure identifies and appreciates that there is a need for providing reliable and high Quality of Service (QoS) links in MANET.

SUMMARY

One embodiment of the disclosure may generally relate to a method for transmitting data from a source node to a destination node in a mobile ad-hoc network. The method may include receiving a route reply packet from a first node by a second node and identifying the route reply packet as an overheard route reply packet by the second node. The method may further include adding a first routing entry in a routing table of the second node by the second node and broadcasting a routing entry added message associated with the first routing entry also by the second node. The first routing entry is associated with the overheard route reply packet. The method may also include receiving data transmitted from a third node by the second node and sending data received from the third node towards the destination node via an active route established based on the first routing entry in the routing table of the second node also by the second node. The data was transmitted by the third node responsive to the routing entry added message by the second node.

Another embodiment of the disclosure may generally relate to a method for transmitting data from a source node to a destination node in a mobile ad-hoc network. The method may include receiving a routing entry added message broadcasted from a second node, wherein the routing entry added message is associated with an overheard route reply packet from a first node by a third node, and adding a first routing entry in a routing table of the third node by the third node, wherein the first routing entry is associated with the overheard route reply packet. The method may further include sending data towards the destination node by the third node via the second node and an active route established based on the first routing entry in the routing table of the third node.

Another embodiment of the disclosure may generally relate to an apparatus at a second node for transmitting data towards a destination node in a mobile ad-hoc network. The apparatus may include a memory and a processing unit arranged to interface with the memory. The processing unit is further configured to receive a route reply packet from a first node, identify the route reply packet as an overheard route reply packet, add a first routing entry in a routing table of the second node, wherein the first routing entry is associated with the overheard route reply packet. The processor unit is also configured to broadcast a routing entry added message associated with the first routing entry, receive data transmitted from a third node, wherein the third node transmitted the data responsive to the routing entry added message, and send data received from the third node towards the destination node via an active route established based on the first routing entry in the routing table of the second node.

Yet another embodiment of the disclosure may generally relate to an apparatus at a third node for transmitting data towards a destination node from in a mobile ad-hoc network. The apparatus may include a memory and a processing unit arranged to interface with the memory. The processing unit is further configured to receive a routing entry added message broadcasted by a second node and the routing entry added message being associated with an overheard route reply packet from a first node, add a first routing entry in a routing table of the third node and the first routing entry being associated with the overheard route reply packet, and send data towards the destination node via the second node and an active route established based on the first routing entry in the routing table of the third node.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the drawings:

FIG. 3 shows an example computer program product of an illustrative embodiment that is arranged for transmitting data in a mobile ad-hoc network.

DETAILED DESCRIPTION

Figure 1A:
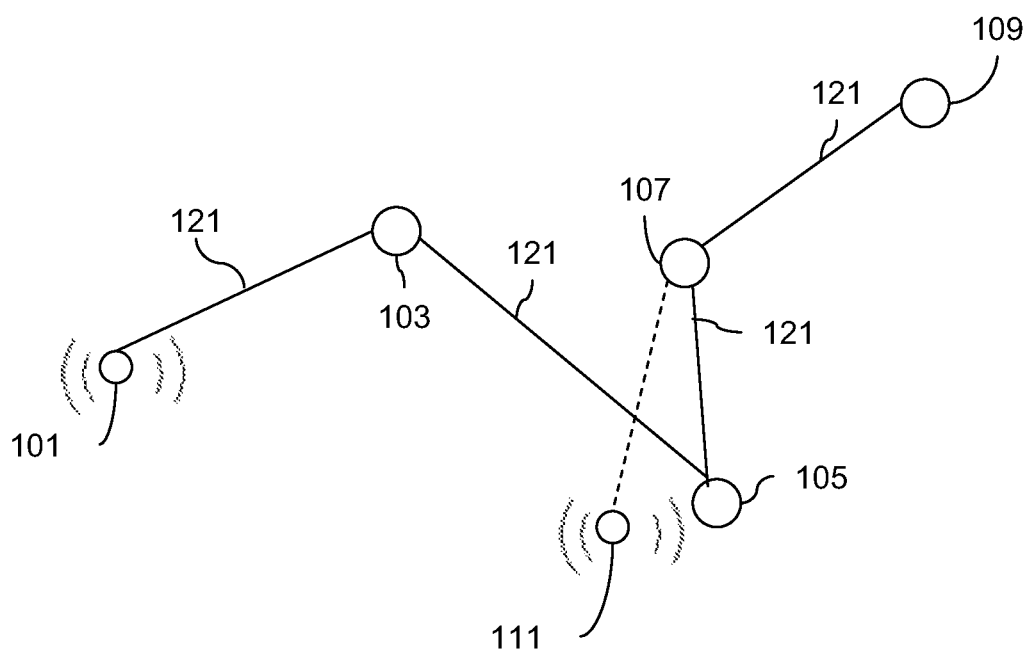
FIG. 1A shows a topology of an active route (shown in solid lines) established in an illustrative embodiment of a mobile ad-hoc network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is drawn, inter alia, to methods, systems, and computer programs for transmitting data in a mobile ad-hoc network. In this disclosure, a "snoop node" can generally be referred to as "overhearing" a packet, when the snoop node receives the packet but is not the intended recipient of the packet. This overhearing characteristic is common in a wireless network, such as a mobile ad-hoc network. A "routing entry added message" can generally be referred to as a message including information associated with a routing entry stored in a node, which broadcasts the message and the address of the node.

Briefly stated, techniques are generally described herein for transmitting data in a mobile ad-hoc network. Some example mobile ad-hoc network may include a source node, a destination node, one or more intermediate nodes, such as a first node, a second node, and/or a third node. Packets are transmitted from the source node to the destination node through an active route of the mobile ad-hoc network. In some embodiments, the second node may be configured to overhear a packet, which is intended to be transmitted to another intermediate node on the active route, from the first node. Based on the overheard packet, the second node is configured to add a first routing entry in its routing table, in which the first node is identified as the next hop towards the destination node. The second node may be configured to further broadcast a message associated with the newly added first routing entry in the mobile ad-hoc network. When the third node receives the broadcasted message, the third node is also configured to add a first routing entry in its routing table, in which the second node is identified as the next hop towards the destination node. A new active route from the source node to the destination node may be established based on the newly added first routing entry in the routing table of the third node and also the newly added first entry in the routing table of the second node.

FIG. 1A shows a topology of an active route 121 (shown in solid lines) established in an illustrative embodiment of a mobile ad-hoc network 100 arranged in accordance with the present disclosure. The mobile ad-hoc network 100 may include a source node 101, a destination node 109, and a route 121 through which data is exchanged between the source node 101 and the destination node 109. The route 121 may include more than one intermediate nodes, such as a node 103, a node 105, and a node 107. The mobile ad-hoc network 100 may include other nodes that are not on the active route 121, such as a snoop node 111.

The active route 121 may be determined by some known routing protocols (e.g., ad-hoc on-demand distance vector (AODV) routing protocol). In such protocols, the mobile ad-hoc network 100 is silent until a connection is needed. Suppose a requesting node, such as the source node 101, requires a connection to a destination node, such as the destination node 109. The source node 101 broadcasts a route request packet (e.g., RREQ) for connection. Other nodes (e.g., intermediate nodes) in the network are configured to receive the route request packet, identify the node that transmitted the route request packet, and forward (i.e., re-transmit) the route request packet. Since multiple nodes may receive the route request packet, multiple temporary routes can be created between the receiving node and the source node 101. Intermediate nodes are also configured to determine if a known route exists between the intermediate node and the destination node 109. When an intermediate node (e.g., the node 107) determines that a known route already exists to the destination node 109, the intermediate node sends a route reply packet back to the node from which the intermediate node received the route request packet in a unicast transmission and also through a temporary route back to the source node 101. As the intermediate nodes send the route reply packets back to the source node 101, each node along the active route stores information about the previous node from which the packet was received.

When transmitting the route reply packet, the route reply packet may be overheard by a snoop node (e.g., the snoop node 111) in the proximity of the intended recipient node (e.g., the node 105). The route reply packet may be also overheard by a node in the proximity of the node which transmits the route reply packet. As mentioned above, the overhearing characteristic is common in a wireless network (e.g., the mobile ad-hoc network 100). The snoop node 111 may retrieve the source node address and the destination address from the route reply packet. In addition, the snoop node 111 may be configured to identify its previous node that transmitted the route reply packet to the snoop node 111. The snoop node 111 may add a first routing entry, which may include the source node address, the destination address, and the next hop (e.g., node 107) towards the destination node 109, in its routing table and also broadcast a routing entry added message in the mobile ad-hoc network 100.

The routing entry added message broadcasted by the node (e.g., the snoop node 111) may include information associated with the first routing entry (e.g., the next hop is the node 107) and the address of the node that broadcasts the message (e.g., the address of the snoop node 111). In some embodiments, the routing entry added message may be received by nodes on the route 121, such as the node 103 or the source node 101. Based on the routing entry added message, the node on the route 121 may also add a first routing entry in its routing table, in which the node that broadcasted the message (e.g., the snoop node 111) is identified in the routing table as the next hop towards the destination node (e.g., the destination node 109). In this scenario, when a packet arrives at the node 103, the packet can be transmitted towards the destination node 109 via the snoop node 111 based on the newly added first routing entry in the routing table of the node 103 and then via the node 107 based on the newly added first routing entry in the routing table of the snoop node 111.

Figure 1B:
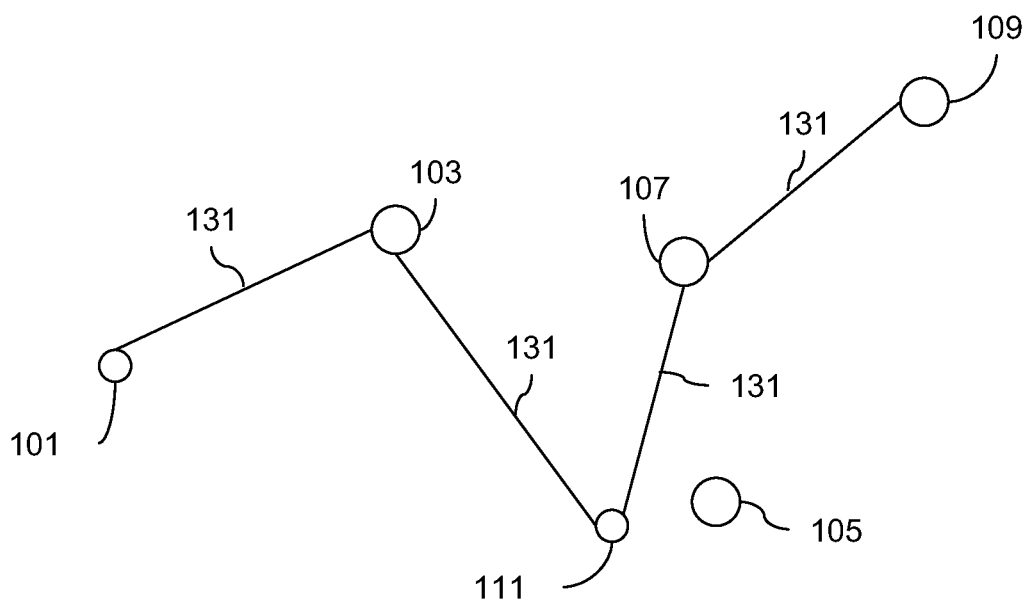
FIG. 1B shows a topology of another active route (shown in solid lines) established in an illustrative embodiment of a mobile ad-hoc network.

FIG. 1B shows a topology of another active route 131 (shown in solid lines) established in an illustrative embodiment of a mobile ad-hoc network 130 arranged in accordance with the present disclosure. As discussed above, after the snoop node 111 adds a first routing entry in its routing table and also broadcasts a routing entry added message in the mobile ad-hoc network 130, an example routing table of the snoop node 111 is listed below:

TABLE 1

| Source | Destination | Next Hop |
|--------|-------------|----------|
| 101    | 109         | 107      |

The node 103 may receive the routing entry added message. After the node 103 adds a first routing entry to its own routing table, an example routing table of the node 103 is listed below:

TABLE 2

| Source | Destination | Next Hop |
|--------|-------------|----------|
| 101    | 109         | 105      |
| 101    | 109         | 111      |

Suppose the example routing table initially has an existing routing entry (i.e., the second row of the Table 2). The node 103 adds the first routing entry (i.e., the third row of Table 2) after having received the routing entry added message. The existing routing entry indicates that the node 103 is configured to route data originated from the source node 101 to the node 105 as the next hop towards the destination node 109. The newly added first routing entry indicates that the node 103 is configured to route data originated from the source node 101 to the snoop node 111 as the next hop towards the destination node 109. Therefore, the node 103 may select either the existing routing entry to send data via a first active route established based on the existing routing entry (e.g., the route 121 of FIG. 1A) or the first routing entry to send data via a second active route established based on the first routing entry (e.g., the route 131 of FIG. 1B) between the source node 101 and the destination node 109. In some embodiments, the node 103 may select both the existing routing entry and the first routing entry from its routing table to transmit data. For example, the node 103 may use the two routes based on the existing routing entry and the first routing entry in turn. The node 103 may send a first packet to the node 105 based on the existing routing entry, a second packet to the node 111 based on the first routing entry, a third packet to the node 105, a fourth packet to the node 111, and so on and so forth.

Figure 1C:
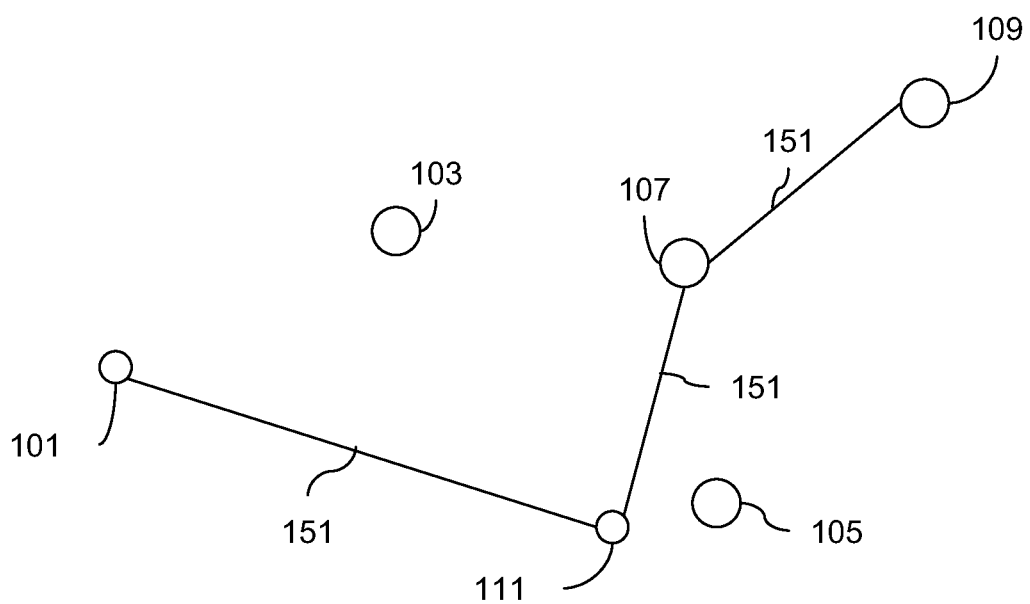
FIG. 1C shows a topology of yet another active route (in solid lines) established in an illustrative embodiment of a mobile ad-hoc network.

FIG. 1C shows a topology of yet another active route 151 (in solid lines) established in an illustrative embodiment of a mobile ad-hoc network 150 arranged in accordance with the present disclosure. As discussed above, after the snoop node 111 adds a first routing entry in its routing table and broadcasts a routing entry added message in the mobile ad-hoc network 150, an example routing table on the snoop node 111 is listed below:

TABLE 3

| Source | Destination | Next Hop |
|--------|-------------|----------|
| 101    | 109         | 107      |

The source node 101, instead of the node 103 of FIG. 1B, may receive the routing entry added message. After the source node adds a first routing entry to its own routing table, an example routing table of the node 101 is listed below:

TABLE 4

| Source | Destination | Next Hop |
|--------|-------------|----------|
| 101    | 109         | 103      |
| 101    | 109         | 111      |

Suppose the example routing table initially has an existing routing entry (i.e., the second row of Table 4). The source node 101 adds the first routing entry (i.e., the third row of Table 4) after having received the routing entry added message. The existing routing entry indicates that the source node 101 is configured to route data to the node 103 as the next hop towards the destination node 109. The newly added first routing entry indicates that the node 101 is configured to route data to the snoop node 111 as the next hop towards the destination node 109. Therefore, the source node 101 may send data via either a first active route (e.g., the route 121 of FIG. 1A) or a second active route (e.g., the route 151 of FIG. 1C) towards the destination node 109. In some embodiments, the source node 101 may send data via both the first active route and the second active route towards the destination node 109.

For a node on the first active route between the source node and the destination node, the aforementioned added routing table entries may enable the node to recognize one or more alternative routes (e.g., the second active route) between the source node to the destination node. More specifically, unlike known on-demand protocols, the node is not required to actively discover alternative routes when the first active route is not available. The node may check its routing table and resulting in a shorter route acquisition latency.

Figure 2:
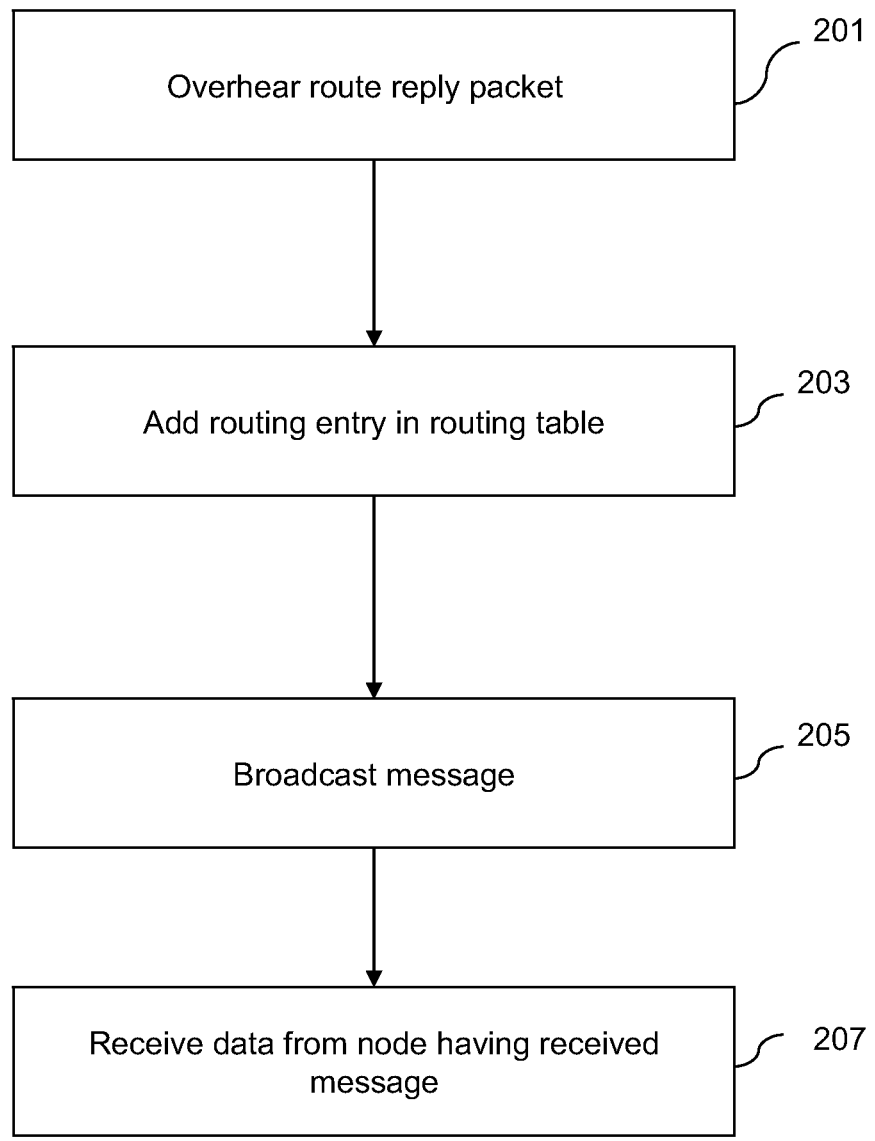
FIG. 2 shows a flow chart of an illustrative embodiment of a method for transmitting data in a mobile ad-hoc network.

FIG. 2 is a flow chart of an illustrative embodiment of a method for transmitting data in a mobile ad-hoc network arranged in accordance with the present disclosure. The method 200 may include one or more operations, functions, or actions as illustrated by blocks 201, 203, 205, and/or 207. The various blocks are not intended to be limiting to the described embodiments. For example, one skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In block 201 (overhear route reply packet), a node in a mobile ad-hoc network, such as the snoop node 111 of FIG. 1A, may overhear a route reply packet. In some embodiments, after having received a route request packet, when a first node sends the route reply packet in a unicast transmission to an intended node (e.g., the node 105 of FIG. 1A), this unicasted route reply packet may be overheard by a second node (e.g., the snoop node 111). Block 201 may be followed by block 203.

In block 203 (add routing entry in routing table), the second node, after having overheard this route reply packet, is configured to add a first routing entry in its routing table, in which a next hop towards the destination node is specified. Block 203 may be followed by block 205.

In block 205 (broadcast message), the same second node may broadcast a message in the mobile ad-hoc network. In some embodiments, the message may include information associated with the first routing entry (e.g., the next hop information) in the routing table of the second node and the address of the second node. The message may be received by a third node on an active route (e.g., the node 103 on the active route 121 of FIG. 1A) between the source node and the destination node. The third node, after having received the broadcasted message, may add a first routing entry to its own routing table. Block 205 may be followed by block 207.

In block 207 (receive data from node having received message), the second node may receive data via a new active route established based on the newly added first routing entry in the routing table of the third node.

FIG. 3 shows an example computer program product 300 that is arranged for transmitting data in a mobile ad-hoc network in accordance with the present disclosure. The computer program product 300 may include a signal bearing medium 304. The signal bearing medium 304 may include one or more sets of executable instructions 302 for executing at least the method described above and illustrated in FIG. 2.

In some implementations, the signal bearing medium 304 may encompass a non-transitory computer readable medium 308, such as, but not limited to, a hard disk drive (HDD), a Compact Disc (CD), a Digital Video Disk (DVD), a digital tape, memory, etc. In some implementations, the signal bearing medium 304 may encompass a recordable medium 310, such as, but not limited to, memory, read/write (R/W) CDs, R/W DVDs, etc. In some implementations, the signal bearing medium 304 may encompass a communication medium 306, such as, but not limited to, a digital and/or an analog communication medium (e.g., a fiber optic cable, a waveguide, a wired communication link, a wireless communication link, etc.).

Figure 4:
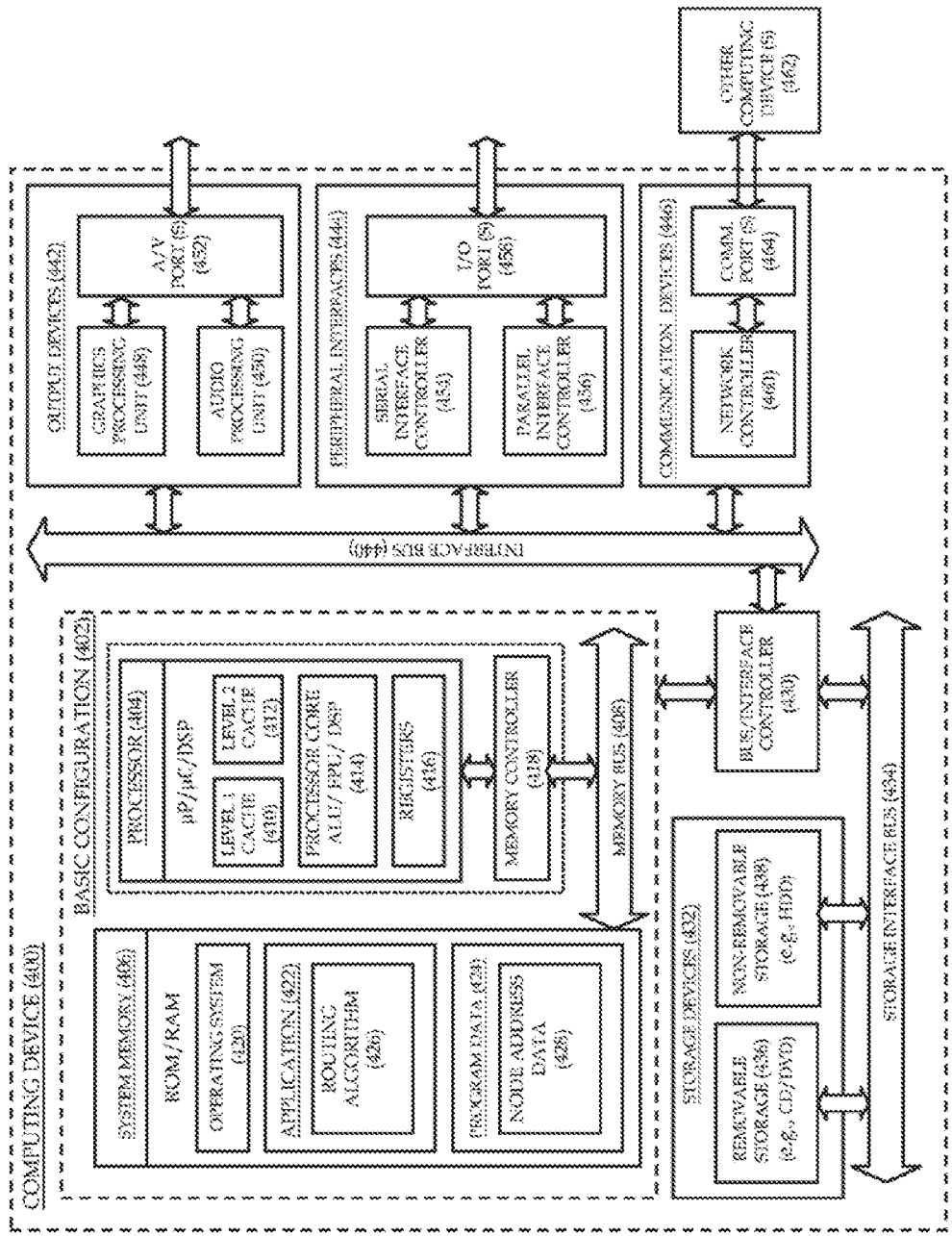
FIG. 4 shows an example computing device of an illustrative embodiment that is arranged for transmitting data in a mobile ad-hoc network, all arranged in accordance with the present disclosure.

FIG. 4 shows an example computing device 400 that is arranged for transmitting data in a mobile ad-hoc network in accordance with the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a routing algorithm 426 that is arranged to perform the functions as described herein including at least those described with respect to one or more of blocks 201, 203, 205, 207, and 209 of the method 200 of FIG. 2. Program data 424 may include node address data 428 that may be useful for operation with routing algorithm 426. In some embodiments, the routing algorithm 426 may utilize the node address data 428 to identify a new route from a source node to a destination node in the mobile ad-hoc network as set forth above. In some embodiments, application 422 may be arranged to operate with program data 424 on operating system 420 such that implementations of transmitting data in a mobile ad-hoc network may be provided as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more NV ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464. In some embodiments, the other computing devices 462 may include other applications, which may be operated based on the results of the application 422.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link and/or channel, a wireless communication link and/or channel, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method to transmit data from a source node to a destination node in a mobile ad-hoc network that includes a first node, a second node, and a third node, the method comprising:
   during establishment of a first route that includes the first node and the third node, wherein the first route is intended for transmission of data between the source node and the destination node:
   receiving, by the second node, an overheard route reply packet from the first node; and
   after having received the overheard route reply packet from the first node:
      adding, by the second node, a first routing entry in a first routing table of the second node, wherein the first routing entry includes the source node, the destination node, and the first node as a next hop towards the destination node;
      broadcasting, by the second node, a routing entry added message that includes information of the first routing entry in the first routing table of the second node and an address of the second node, wherein responsive to the routing entry added message received by the third node, adding a second routing entry in a second routing table of the third node, the second routing entry indicates that the second node is the next hop towards the destination node; and
      in response to the third node that transmits a first part of data towards the destination node via a fourth node on the first route according to an existing routing entry in the second routing table:
         receiving a second part of data from the third node, by the second node, according to the second routing entry in the second routing table; and
         sending the second part of data received from the third node, by the second node, to the first node according to the first routing entry in the first routing table.

2. A method to transmit data from a source node to a destination node in a mobile ad-hoc network that includes a first node, a second node, and a third node, the method comprising:
   during establishment of a first route that includes the first node and the third node, wherein the first route is intended for transmission of data between the source node and the destination node:
   receiving a routing entry added message broadcasted from the second node that overhears a route reply packet from the first node, by the third node being any node on the first route except the destination node, wherein the second node is not on the first route, and the routing entry added message is in response to a first routing entry added in a first routing table of the second node that includes the source node, the destination node, and the first node as a next hop from the second node towards the destination node, and wherein the first routing entry is associated with the overheard route reply packet;
   adding a second routing entry in a second routing table of the third node responsive to the received routing entry added message, by the third node, wherein the second routing entry indicates that the second node is the next hop from the third node towards the destination node;
   sending a first part of data, by the third node, towards the destination node via a fourth node on the first route according to an existing routing entry in the second routing table; and
   sending a second part of data, by the third node, to the second node on a second route according to the second routing entry in the second routing table, wherein the second route is intended for transmission of data between the source node and the destination node, which is not actively discovered, and includes the first node and the second node.

3. The method of claim 2, wherein the existing routing entry does not include the second node as the next hop towards the destination node.

4. An apparatus configured to transmit data towards a destination node in a mobile ad-hoc network that includes a first node, a second node, and a third node, the apparatus being at the second node and comprising:
   a memory; and
   a processing unit arranged to interface with the memory, wherein the processing unit is configured to:
   during establishment of a first route that includes the first node and the third node, wherein the first route is intended for transmission of data between a source node and the destination node:
   receive an overheard route reply packet from the first node; and
   after having received the overheard route reply packet from the first node:
      add a first routing entry in a first routing table of the second node, wherein the first routing entry includes the source node, the destination node, and the first node as a next hop towards the destination node;

broadcast a routing entry added message that includes information of the first routing entry and an address of the second node; and in response to the routing entry added message received by the third node and a second routing entry added in a second routing table of the third node, wherein the second routing entry indicates the second node is the next hop towards the destination node, and the third node that transmits a first part of data towards the destination node via a fourth node on the first route according to an existing routing entry in the second routing table, the processing unit is further configured to:

receive a second part of data from the third node according to the second routing entry in the second routing table; and send data received from the third node from the second node to the first node according to the first routing entry in the first routing table.

5. An apparatus configured to transmit data towards a destination node in a mobile ad-hoc network that includes a first node, a second node, and a third node, the apparatus being at the third node and comprising:

a memory; and a processing unit arranged to interface with the memory, wherein the processing unit is configured to:

during establishment of a first route that includes the first node and the third node, wherein the first route is intended for transmission of data between a source node and the destination node:

receive a routing entry added message broadcasted by the second node that overhears a route reply packet from the first node, wherein the second node is not on the first route, and the routing entry added message is in response to a first routing entry added in a first routing table of the second node that includes the source node, the destination node, and the first node as a next hop from the second node towards the destination node, and wherein the first routing entry is associated with the overheard route reply packet;

in response to the received routing entry added message, add a second routing entry in a second routing table of the third node being any node on the first route except the destination node, wherein the second routing entry indicates that the second node is the next hop from the third node towards the destination node;

send a first part of data towards the destination node via a fourth node on the first route according to an existing routing entry in the second routing table; and send a second part of data to the second node on a second route according to the second routing entry in the second routing table, wherein the second route is intended for transmission of data between the source node and the destination node, which is not actively discovered, and includes the first node and the second node.

6. The apparatus of claim 5, wherein the existing routing entry does not include the second node as the next hop towards the destination node.

* * * * *

UNITED STATES PATENT AND TRADEMARK OFFICE
CERTIFICATE OF CORRECTION

PATENT NO. : 9,661,551 B2  
APPLICATION NO. : 13/147594  
DATED : May 23, 2017  
INVENTOR(S) : Zhang et al.

Page 1 of 1

It is certified that error appears in the above-identified patent and that said Letters Patent is hereby corrected as shown below:

In the Specification

In Column 8, Line 32, delete "NV ports" and insert -- A/V ports --, therefor.

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*